Dec. 8, 1936.  L. B. BEATH  2,063,783
AIR PRESSURE REGULATING APPARATUS
Filed March 12, 1936  4 Sheets-Sheet 1

Inventor
Lancelot B. Beath
By
Atty.

Dec. 8, 1936.    L. B. BEATH    2,063,783
AIR PRESSURE REGULATING APPARATUS
Filed March 12, 1936    4 Sheets-Sheet 2

Inventor:
Lancelot B. Beath
by [signature]
Atty.

Dec. 8, 1936.                L. B. BEATH                2,063,783
                    AIR PRESSURE REGULATING APPARATUS
                 Filed March 12, 1936        4 Sheets-Sheet 3
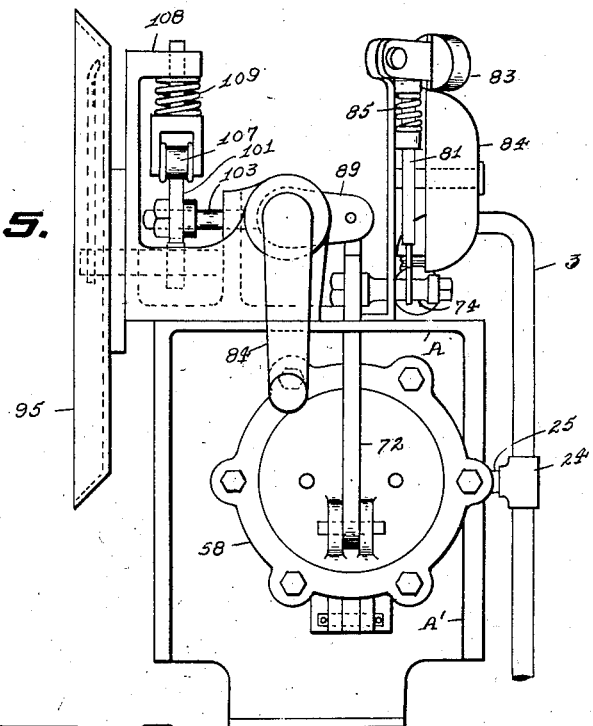
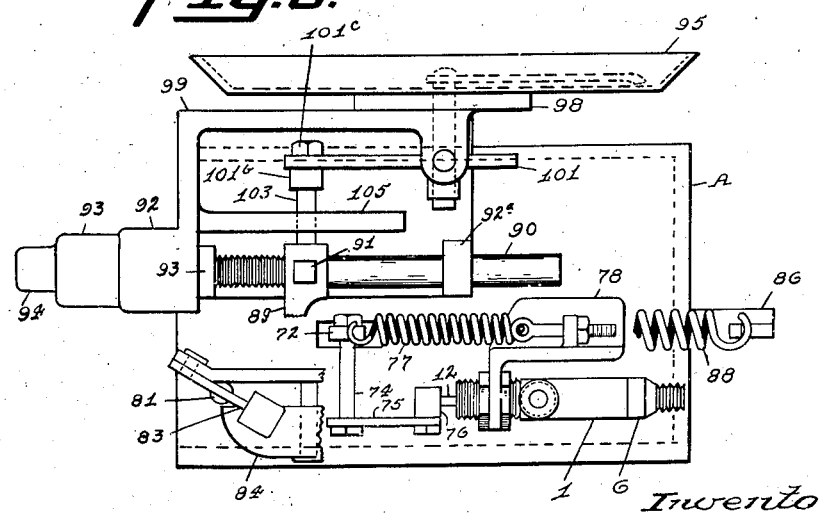
Inventor
Lancelot B. Beath
by
Atty Dec. 8, 1936.  L. B. BEATH  2,063,783
AIR PRESSURE REGULATING APPARATUS
Filed March 12, 1936    4 Sheets-Sheet 4
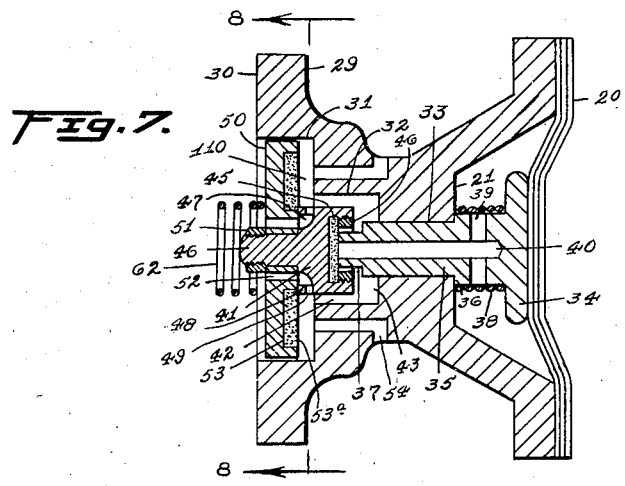
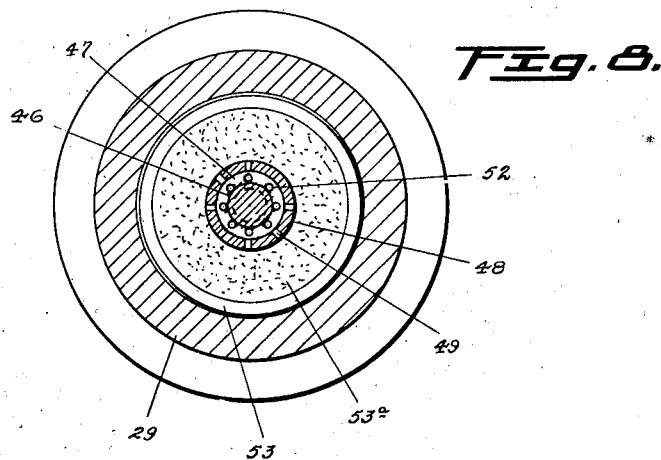
Inventor
Lancelot B. Beath
by
Atty.

Patented Dec. 8, 1936

2,063,783

UNITED STATES PATENT OFFICE 2,063,783

AIR PRESSURE REGULATING APPARATUS

Lancelot B. Beath, Toronto, Ontario, Canada, assignor to W. D. Beath & Son, Limited, Toronto, Ontario, Canada Application March 12, 1936, Serial No. 68,573

11 Claims. (Cl. 50—11)

My invention relates to improvements in air pressure regulating apparatus adapted particularly for use in connection with apparatus for dispensing air at definite predetermined pressures to automobile tires and the like.

My invention is directed primarily to that type of dispensing apparatus wherein manually adjustable means capable of being set for different pressures is subjected to the pressure in the service line whereby on the pressure in the line exceeding the pressure which said adjustable means is set to withstand a valve in the service line is brought to a closed position and upon the reduction of pressure in the service line below the pressure to which said means is set, due to the closing of the valve, the said adjustable means acts to cause the said valve to move to its open position.

In connection with the above described type of apparatus, which is well known in the art, certain disadvantages have become apparent, one of the most important of which is the failure of the pressure indicating and dispensing elements to coordinate above certain limits of pressure, where an extremely high degree of pressure is required in the tire, with the disparity increasing in proportion as the pressure rises in the tire, or other object, above said limits, thereby making it impossible to know with any degree of accuracy during the latter stages of the filling operation what pressure has been attained in the tire.

I aim to provide by the present invention air pressure regulating apparatus which can be set to give any predetermined pressure in the tire, or other object, within the limits of the supply, and which will accurately build up in the object being inflated the predetermined pressure in exact accordance with the indication on the visible dial.

Other objects of the invention are to provide a mechanism having such rapidity of action as to provide an almost continuous flow of air to the tire, whereby the inflation operation will be accomplished in the shortest possible time; to provide means for indicating to the user the commencement, duration and cessation of the inflating operation; and to provide a generally improved apparatus for the purposes to which it may be applied.

There are many details contributing to the accomplishment of the general objects just set forth and these together with the objects and advantages will appear from the following description and be particularly pointed out in the appended claims.

In describing the invention reference will be made to the accompanying drawings in which:

Figure 5 is an end elevation of the dispenser.

Figure 6 is a plan view with certain parts broken away.

Figure 7 is an enlarged vertical sectional view through the valve mechanism interposed between the diaphragm.

Figure 8 is a cross sectional view taken on the line 8—8 of Figure 7.

Like numerals of reference indicate corresponding parts in the various figures.

Figure 1:
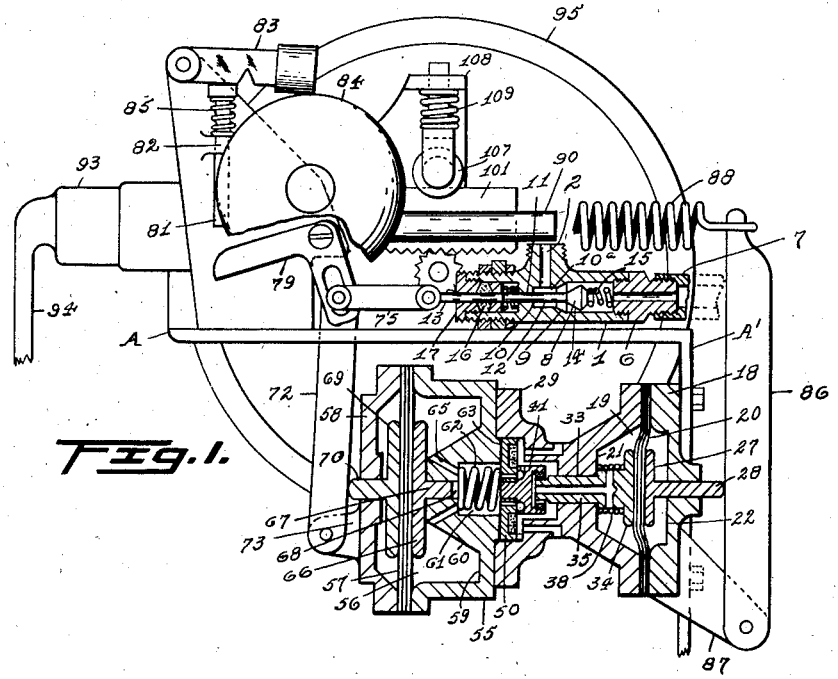
Figure 1 is a rear elevation of my improved air pressure regulating apparatus, with certain of the parts thereof shown in vertical section and the valve shown in its open position.
Figure 2:
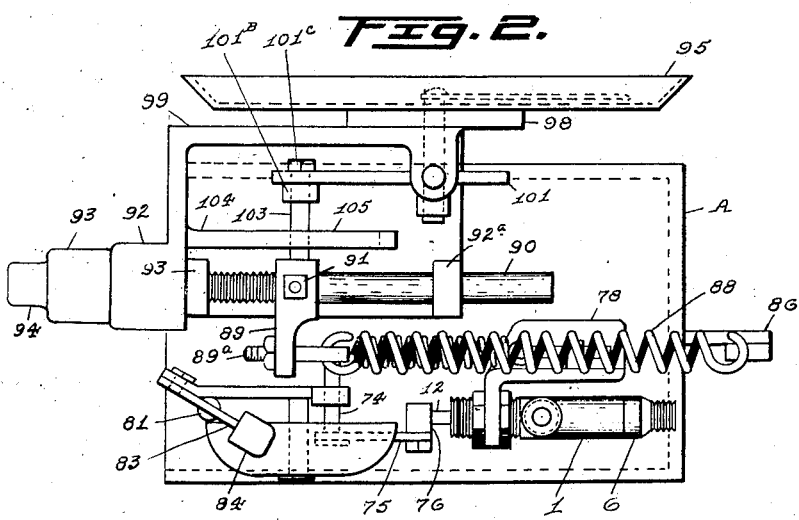
Figure 2 is a plan view of the structure shown in Figure 1.
Figure 3:
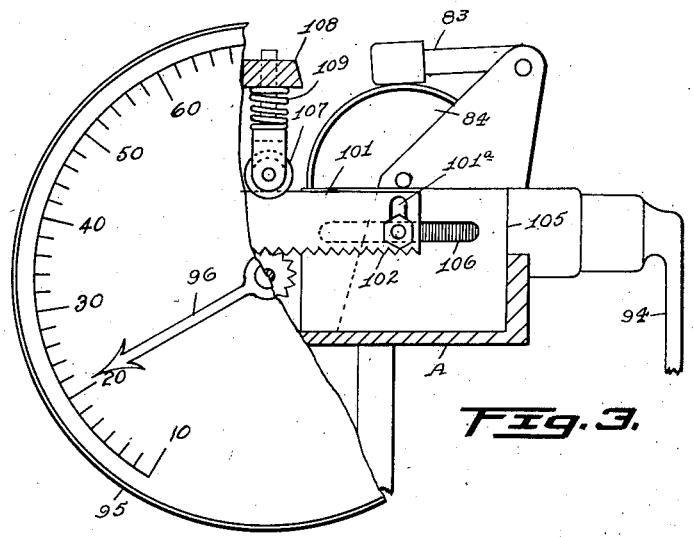
Figure 3 is a front elevation of a portion of the device with the dial broken away.

Referring to the drawings a suitable frame A provides a means for supporting the various operating parts of my invention which embodies a horizontally disposed valve casing 1 having a longitudinal bore therethrough and an intermediately located lateral outlet passage 2 leading from said bore through the wall of the casing and to which is adapted to be connected one end of a pipe 3, which latter at its other end connects with a suitable service hose having at its distributing end the customary chuck having therein a valve normally closed but adapted on application to the valve stem of the tire to be moved to open position whereby to permit of the passage of air to the tire. The inlet end of the valve casing has inserted therein a suitable nipple 6 to which is connected one end of an inlet pipe 7 which leads from a suitable supply tank in which the air supply is preferably maintained at a pressure substantially greater than the pressure to be supplied through the service hose.

The bore of the valve casing 1 for the greater portion of the distance between the nipple 6 and the lateral outlet 2 is of sufficient diameter to provide for the operation of a valve 8 of desired dimensions therein, but at a point adjacent to said outlet is reduced to provide a conical valve seat 9 positioned between said inlet and outlet, and said bore is further reduced at a point 10 beyond said outlet whereby to provide an air chamber 10a in communication with the outlet passage 2 and also to provide a guide opening 11 in which the stem 12 of the valve is adapted to be reciprocated and in which also operates a push rod 13 adapted at its one end for engagement with the valve stem and at its other end projects from the valve casing.

The valve 8 which is adapted for reciprocation within the large portion of the bore of the casing 1 is preferably octagonal in cross section, or of other shape dissimilar to that of said bore, so as to permit of the passage of air past the valve, and is provided with a tapered portion 14 corresponding to the seat 9 with which it is adapted to contact in the closed position of the valve.

A compression spring 15 positioned within the valve chamber exerts pressure on the valve towards the seat 9 and tends to hold said valve closed.

The bore of the casing at the end from which the push rod 13 projects is preferably enlarged and suitable packing 16 inserted around the stem and a suitable packing nut 17 secured into the end of the casing.

18 is a casing mounted on the inner face of the vertical wall A' of the supporting frame A and providing towards one end thereof, an interior chamber 19 in which is positioned a vertically arranged diaphragm 20. The diaphragm 20 is positioned slightly to the outer side of the centre of the chamber 19 whereby that portion of the chamber between the diaphragm and the inner wall 21 adapted to receive air under pressure will be of greater width than the portion between the diaphragm and the outer, or front wall 22.

A pipe fitting 24 is interposed in the pipe 3 adjacent the diaphragm casing and has a lateral extension 25 providing a by-pass communicating with the interior of said casing at a point between the diaphragm 20 and the inner wall 21 of said chamber whereby air is admitted to the diaphragm chamber for the purposes to be described in detail hereinafter.

A disc 27 is secured centrally of the outer, or front face of the diaphragm 20 and has a pin 28 extending therefrom and slidably projecting through an opening in the outer wall of the casing and through the supporting wall A', whereby mechanical pressure in accordance with the pressure of air required in the object to be inflated brought to bear against said pin will cause the diaphragm 20 to be actuated rearwardly in the chamber 19.

The casing 18 has a rearwardly extending portion 29 terminating in a vertical face 30 wherein are provided two concentric circular recesses 31 and 32 respectively, the inner recess 32 being of lesser diameter but of greater depth than the recess 31, and also concentric with said recesses is a circular valve opening 33 extending completely through the remaining portion of the casing and communicating with the interior of the diaphragm chamber 19.

A disc 34 second to the rear face of the diaphragm 20 carries a rearwardly extending plunger, or valve 35 slidably projecting through the opening 33 in the inner wall 21 of the diaphragm chamber, the said plunger, or valve, having an intermediate shoulder 36 positioned within the diaphragm chamber whereby to limit the outward movement of the valve to the required valve throw and also to resist inward mechanical pressure on the diaphragm by means of which pressure said valve is directed to its rearward limit. The valve 35 is of such length that when in its rearmost position, that is with the shoulder 36 in engagement with the inner wall 21 of the diaphragm casing, it will project into the recess 32 in the rear face of the casing, such projecting portion of the valve for a part of its length being of even diameter with the body of the valve and thereafter being of reduced diameter as shown at 37. A coil spring 38 encircling the valve 35 and confined between the disc 34 and the wall 21 of the diaphragm exerts pressure on the diaphragm in a forward direction and tends to hold the valve 35 open.

The plunger 35 is provided with a transverse air passage 39 positioned within the chamber 19 and a longitudinal air passage 40 registering with said transverse passage and leading outwardly through the end of said plunger whereby to provide a clear passage for air from the service pipe 3 for the purpose of closing the valve in the service line, in the manner to be described hereinafter, upon the pressure of air in the diaphragm chamber reaching such proportions as to overcome the mechanical pressure set against the pin 28 carried on the front face of the diaphragm.

41 is a movable valve member positioned within the inner recess 32 and adapted to be contacted by the end of the valve 35, and to be moved rearwardly thereby in the closing operation of said valve, the said member 41 being circular in plan and of slightly lesser dimensions than said recess both as to diameter and depth whereby to provide an annular air passage 42 therearound and an air passage 43 between the end adapted for engagement by said valve 35 and the base of the recess, which latter passage communicates at its ends with the annular passage 42 and is adapted in one position of the valve 35 to be closed by said valve. The member 41 is provided, at its end adapted for contact by the valve 35, with a suitable recess into which the reduced end 36 of said valve is adapted to extend in one position thereof and having therein a seat 45 of rubber or other suitable material. A suitable ring 46 threading into the interiorly threaded wall of the recess serves to hold the seat 45 in position. The member 41 is provided on its face opposite to that adapted for contact by the valve 35 with an integral threaded bolt 46 extending laterally from the centre thereof through the recess 31, and the face of said member around the base of said bolt is recessed as at 47, providing an annular wall 48. The wall 48 has a number of ports 49 cut therethrough whereby to provide a plurality of air passages through which the air from the annular passage 42 may pass to the recess 47.

It will be obvious from the foregoing that when the valve 35 is free of contact with the seat 45 of the member 41 a clear passage for air is provided around said member but in the closed position of said valve the air cannot pass to the rear side of the said member.

A disc 50 slidably fitting within the outer recess 31 in the wall of the extension 29 and being of slightly lesser depth than said recess whereby to permit of movement within said recess is securely fastened to the member 41 by means of the bolt 46 which passes through said disc and has the nut 51 threading thereon. The disc 50 is provided with a number of air passages 52 in communication at their one ends with the annular recess 47 in the rear face of the member 41 and leading through said disc.

That side of the disc 50 which opposes the member 41 is provided with an annular recess 53 in which is placed a facing 53a constructed of rubber or other suitable material and such facing is of sufficient width to include the annular air passage 42 around the member 41 and also the exhaust ports 54 which lead through the wall of the extension for the purpose of discharging into the outside atmosphere simultaneously with each opening operation of the valve in the supply line the air utilized to close said valve during the last proceeding operation, as will be described in detail hereinafter.

A casing 55 secured over the rear face 30 of the extension 29 provides a closure for the recesses 31 and 32 and also provides in its interior a secondary diaphragm chamber 56. A diaphragm 57 is mounted within the chamber 56 near the rear wall 58.

The wall 59 of the casing 55 is provided with an inwardly tapering portion 60 of relatively greater thickness than the remainder of said wall and this thickened portion is recessed centrally from its outer face to provide a housing 61 in which is located a compression spring 62 which is adapted to exert pressure on the disc 50 in a direction towards the valve 35. As the recess 61 is of lesser diameter than the diameter of the recess in the face 30 of the member 29 an annular shoulder 63 is thus provided and this shoulder serves as a means to limit the rearward movement of the disc 50 and the member 41 to which it is secured.

The thickened inner portion 60 of the wall 59 of the diaphragm casing 55 is substantially conical in form and provides a nozzle-like structure terminating in proximity to the diaphragm 57, said structure being provided with radial openings 65 communicating at their one ends with the interior of the recess 61 and discharging near the apex of said nozzle whereby to concentrate the discharge of air against said diaphragm to move same in a rearward direction.

The diaphragm 57 is provided on its one face with a disc 66 having a centrally disposed lateral bearing member 67 slidable within an opening 68 in the end of the nozzle 60. A disc 69 secured on the opposite, or rear face of the diaphragm 57 carries a projecting pin 70 which slidably extends through the rear wall 71 of the casing.

It will now have been obvious that when the diaphragm 20 is in its rearmost position, under the influence of mechanical pressure, during the building up of the pressure in the service line, but before such pressure has exceeded the pre-set pressure of said mechanical means, the valve 35 is seated against the member 41 and prevents air from reaching the secondary diaphragm chamber 56 but immediately upon the foreward movement of said diaphragm 20 due to the pressure in the chamber 19 overcoming the mechanical pressure (the method of applying which latter will be described fully hereinafter) said valve will be drawn away from its seat and will permit of the passage of air from the diaphragm chamber 19 to the diaphragm chamber 56 whereby to exert outward pressure on the diaphragm 57.

A lever 72 pivoted at its lower end in a suitable bracket 73 mounted on the rear wall of the casing 55 at a point below the pin 70 from the diaphragm 57 extends upwardly in the path of said pin through a slot in the frame A and terminates on substantially the same vertical plane as the push rod 13, to the end of which it is connected by means of a shaft 74 extending laterally from said lever and a pivoted link connection 75 and 76 between said shaft and the push rod.

A coil spring 77 extending parallel with the valve stem and anchored at its one end to a bracket 78 carried by the frame A and at its other end connected to the upper end of the lever 72 exerts a pull on said lever in a like direction to that taken by the valve in moving to its open position.

The various parts are so adjusted in relation to one another in the installation of the device that when the lever 72 is in its straight line position the push rod will be so positioned as to hold the valve 8 and when removal movement is imparted to said lever by the pressure of air from the service line against the diaphragm 57 the push rod will be moved accordingly thereby allowing the spring 15 to seat the valve. On reduction of the pressure on the diaphragm 57 below the tension of the spring 77 said spring will instantaneously exert a pull on the lever and thereby actuate the push rod to move the valve to its open position and the lever to its straight line position.

The coil spring 77 has a threaded connection with the supporting bracket 78 whereby to regulate the tension on said spring.

An intermediately pivoted striker arm 79 has one of its ends operatively connected to the shaft 74 so that on each movement of the lever 72 to bring the valve 8 to its closed position the opposite end of said arm will be given a sharp upward movement into striking engagement with the lower end of a pin 81 which is slidable vertically in a bracket 82. A bell tapper 83 is pivotally mounted above the pin 81 and normally rests thereon and is adapted on being raised by the sharp upward movement of said pin to drop into engagement with the bell 84. A coil spring 85 inserted between the bracket 82 and the head of the pin 81 exerts an upward pressure on said pin.

86 is a lever pivoted at its lower end in a bracket 87 carried by the vertical wall A1 of its frame A at a point below the pin 28 from the diaphragm 20 and extending upwardly beyond the valve casing 1 and adapted to co-act with said pin, so that when an inward pull is exerted on said lever under certain conditions said diaphragm will be moved inwardly to the position shown in Figure 1 and when the diaphragm is moved outwardly again by the pressure of air within the diaphragm chamber the lever is actuated in an outward direction.

A coil spring 88 is connected at its one end to the top end of the lever 86 and extends therefrom in a direction towards the diaphragm casing whereby to exert a pull on said lever in a like direction, and at its other end is connected to one end of a bracket 89 which is mounted on a bolt 90 and to which it is secured by means of a set screw 91. The means for securing the spring 88 to the bracket 89 preferably comprises a threaded eye bolt 89a screwing into said bracket and held by means of a suitable nut, whereby the initially set tension of said spring may be altered. The bolt 90 extends inwardly from the opposite side of the machine to that on which the lever 86 is located and is supported in spaced brackets 92 and 92a carried by the frame A. The tension of the spring 88 is regulated by longitudinal movement of the bolt 90 and this longitudinal movement is accomplished by means of an interiorly threaded sleeve 93 threading over the outer end of the said bolt and held in engagement with the outer side of the bracket 91 by the tension of the spring, whereby upon rotation of the sleeve the bolt will be advanced or withdrawn in relation to the lever 86, according to the direction in which said sleeve is rotated. The sleeve is extended outwardly through the enclosing shell and is provided with a handle 94 by means of which it is rotated.

The tension of the spring 88 is increased or decreased according to the direction in which the bolt 90 is moved and controls the degree of resistance offered by the lever 86 against the pressure of air within the diaphragm chamber 19 to close the main valve 8 and likewise controls the pressure extended on the diaphragm 20 to hold said valve open and as the pressure of air to the tire is limited to the predetermined tension of said spring it is obvious that to obtain any certain degree of pressure within the tire it is simply necessary to set the tension of said spring in accordance with the pressure required in the tire.

In order that the degree of tension of the spring 88 may be known at all times so as to permit of setting the device to give the desired air pressure in the tire a dial 95 is provided having graduations thereon indicative of different degrees of air pressure and over this dial operates an indicator 96 having its movement controlled by the movement of the bolt 90 so that to set the device it is simply necessary to impart longitudinal movement to said bolt by turning the handle 94 until the indicator points to the graduation on the dial indicative of the pressure required in the tire.

The means by which the indicator is moved over the face of the dial through the movement of the bolt 90 comprises the following elements cooperating in the manner hereinafter outlined:—A shaft 97 rotatably journaled in a suitable bearing bracket 98 mounted on an extension 99 carried by the frame A extends through the dial and constitutes the support for the indicator and on the inner end of said shaft is fixedly mounted a gear 100. A horizontally disposed rack 101 rests on the gear 100 with its teeth 102 in mesh therewith whereby on the movement of said rack in an endwise direction a rotary movement will be imparted to the gear to move the indicator over the face of the dial. The rack 101 is supported at one end by a shaft 103 which at its one end extends through a slot 101a arranged transversely of said rack and at its other is fixed to the bracket 89 mounted on the bolt 90. A collar 101b mounted on the shaft 103 provides a stop for the rack and a suitable nut 101c serves to lock the rack tightly against said collar in any desired position within the limits of the stop 101a. The shaft 103 is supported intermediate of its length by a bracket 105 carried by the frame A and which is provided with an elongated slot 106 through which said shaft extends and which permits of lengthwise movement of said rack.

The connection permitting of vertical adjustment between the rack 101 and the shaft 103 permits of raising or lowering the one end of the rack to alter the angle of contact of the rack with the gear 100 which controls the movement of the indicator so as to compensate for any variance in the elasticity of the spring 88 which may have been occasioned by climatic conditions, long usage, or for any other reason.

The rack 101 is held in engagement with the gear 100 by means of a roller 107 suitably supported in a bracket 108 for rotating engagement with the top of said rack above said gear. The roller is resiliently held to its down position by means of a spring 109 bearing downwardly thereagainst.

Figure 4:
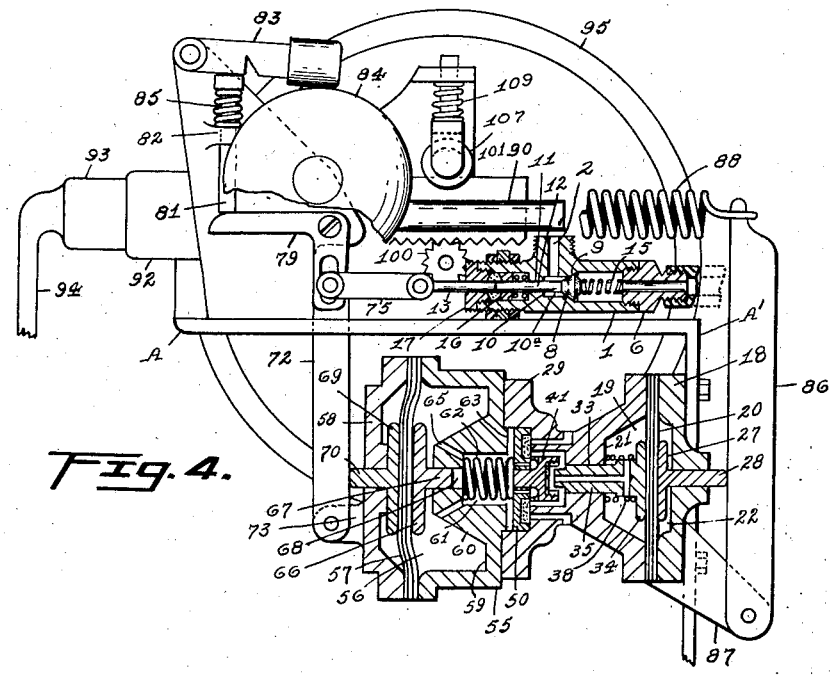
Figure 4 is a rear elevation partly in vertical section and the valve shown in its closed condition.

I will now describe the operation of my invention commencing from the inoperative condition to which the mechanism has been brought by the completion of the last preceding filling operation, the chuck in the discharge end of the service line being closed and the various operating elements being in the positions shown in Figure 4.

The operating handle 94 is turned until the indicator 96 points to the graduation on the dial indicative of the pressure required in the tire, this turning of the handle serving to move the bolt 90 longitudinally and thus regulate the tension on the spring 88 in correspondence with the pressure indicated by the indicator on the dial and as the spring 88 is secured to one end of the lever 86 an inward pull will be exerted on said lever, which latter through its association with the pin 23 from the diaphragm 20 will result in the exertion of rearward pressure on said diaphragm equal to the pressure required in the tire.

The chuck is then placed on the tire valve with the result that the valve in said chuck is opened and the air from the service hose allowed to flow into the tire. This results immediately in the reduction of the pressure in the service line and in the diaphragm chamber 19 to a point below the mechanical pressure exercised by the spring-held lever 86, whereupon the diaphragm 20 is forced rearwardly by said lever 86 and causes the valve 35 to move rearwardly into contact with the seat 45 in the member 41 whereby to prevent the passage of air rearwardly from that point. The inward movement of the diaphragm 20 causes the coil spring 38 to be compressed to such an extent that air from the diaphragm chamber 19 cannot enter the transverse opening 39 in the valve 35. The valve 35 after contacting the seat 45 continues, however, to move rearwardly and to force the member 41 and the disc 50 to their rearmost positions whereby to momentarily open the passage 110 between the disc 50 and the base of its recess and thus allow the air from the secondary diaphragm chamber 56 to flow back into the exhaust ports 54 and to discharge into the atmosphere subsequent to the closing movement of the valve 8 in the service line and prior to the succeeding opening movement thereof whereby to relieve the rearward pressure on the lever 72. When the pressure within the secondary diaphragm chamber, 56, is reduced to the state that it is overcome by the pull of the spring 77 the main valve 8 is moved by the action of said spring on the push rod 13 to its open position and the lever 72 and diaphragm 57 returned to the positions shown in Figure 1.

The air is now allowed to pass into the service line and when the pressure in the service line, and consequently in the diaphragm chamber 19, has been built up to the extent that the pressure of air against the rear face of the diaphragm 20 exceeds the mechanical pressure of the spring-held lever 86 against the front of the diaphragm said diaphragm will be forced outwardly to the position shown in Figure 4, thus drawing the valve 35 forwardly and permitting the valve member 41 and the disc 50 through the action of the spring 62 to assume their forward positions, as shown in Figure 4, thereby closing the ports 42 and the exhaust ports 54. As the throw of the valve 35 is greater than the permitted movement of the members 41 and 50 said valve will continue to move forwardly and away from the seat 45 after the members 41 and 50 have reached their forward limits and thus open communication between the air passage 40 through the valve and the passage 43, the spring 38 in the meantime, due to the forward movement of the diaphragm 20, having uncoiled sufficiently to permit the air in the diaphragm chamber to pass through the transverse opening 39 into the longitudinal opening 40. The air then flows through the passages 43 into the annular passage 42, through the ports 49 into the recess 47 in the rear face of the member 41, thence through the ports 49 in the disc 50 and on through the recess 61 and the ports 65 into the diaphragm chamber 56, causing rearward pressure on the diaphragm 57 whereby the upper end of the lever 72 is moved rearwardly and draws the push rod 13 rearwardly against the pull of the spring 77, thereby relieving the pressure on the valve stem and allowing the valve 8 to be seated by the action of the spring 15 as shown in Figure 4. Owing to the connection between the top end of the lever 72 and the crank position of the striker arm 72 each movement of said lever 72 to bring the valve 8 to its seat will result, through the medium of said arm and the pin 81, in the raising of the bell tapper 83 and the consequent sounding of the bell.

If, in the closed position of the valve 8, the pressure of air in the tire and in the service line and in the diaphragm chamber 19 equals the tension of the spring 88 the device will cease to operate further, but, if such air pressure is still too low to resist the pull of the spring the said spring will draw the lever 86 inwardly and again force the diaphragm 20 rearwardly in the manner hereinbefore described to open the valve 8. These cycles of operations will continue with the bell sounding on the completion of each closing movement of the valve 8, until such time as in the closed condition of said valve the pressure in the tire and in the service line and in the diaphragm chamber 19 equals the tension to which the spring 88 is set and is therefore sufficiently high to resist the pull of said spring so that said spring is prevented from operating the diaphragm 20 rearwardly to accomplish the opening of the valve 8.

The present invention provides mechanism for moving the valve 8 which will operate with such rapidity that the valve will not be permitted to remain in its closed position long enough to allow a high pressure to be built up in the valve chamber for forceful delivery on the opening of the valve, but, will be moved away from its seat almost upon the instant of contact therewith, thereby making for an almost continuous flow of air to the tire in place of distinct forceful charges of several pounds each, as in the case of various devices used heretobefore, and which frequently results in overinflation of the tire due to the force with which the charge is delivered compelling the whole charge to enter the tire before the operating mechanism has had time to close the valve.

As the flow through the pipe line is so nearly continuous it is readily apparent that in the last stage of the inflation process the instant the pressure in the diaphragm chamber 19 exceeds the resistance offered by the lever 86 the valve will be brought to its closed position and held there due to the now equalized pressure in the tire and in the diaphragm chamber resisting the return of the lever, thereby cutting off the further admittance of air to the tire at the exact instant that the pressure therein has reached the desired maximum and assuring absolute accuracy.

While the preferred embodiment of the present invention has been herein shown and described it is of course to be understood that alterations in details of construction and arrangements of parts as comes within the scope of the following claims for novelty may be made.

What I claim is:—

1. In air pressure regulating apparatus, an air line having a valve controlled discharge end, a valve in said line, and means for opening and closing the valve during a period of predetermined pressure development at the valve controlled discharge end, comprising spaced pivoted levers, one of which levers is spring-actuated to open the valve in said line, means for subjecting said levers to pressure in the air line beyond the valve in the direction of flow, and valve mechanism interposed in the pressure line between said levers and operable through movement of one of said levers to alternately open and close the air passage to the other of said levers.

2. In air pressure regulating apparatus, an air line having a valve controlled discharge end, a valve in said line, means for opening and closing the valve during a period of predetermined pressure development at the valve controlled discharge end, comprising spaced pivoted levers, one of which levers is spring actuated to exert opening influence on said valve, means for subjecting said levers to pressure in the air line beyond the valve in the direction of flow, valve mechanism interposed in the air line between said levers, means for setting the resistance of one of said levers to correspond to the pressure required at the discharge end of the line whereupon increase of pressure in said line above the pressure said one lever has been set to withstand will result in the actuation of said valve mechanism to admit air to actuate the spring-actuated lever in a direction to permit the valve in the air line to close, means for visibly indicating the pressure which said one lever has been set to withstand, and means for audibly indicating each movement of said valve to its closed position.

3. In air pressure regulating apparatus, an air line having a valve controlled discharge end, a valve in said line, a spring actuated lever operating in one direction to hold said valve open, a lever movable in one direction by air pressure, manually adjustable means for compelling movement of the second lever in the opposite direction, means for subjecting said levers to pressure in the air line beyond the valve in the direction of air flow, valve mechanism interposed in said means, means adapted when the air pressure on the second lever is increased above the pressure of said manually adjustable means to actuate said valve mechanism to open the air passage to the first lever, whereby said first lever is moved to permit the valve in the air line to close.

4. In air pressure regulating apparatus, an air line having a valve controlled discharge end, a valve in said air line, spring means extending pressure to hold said valve open, said means being responsive to the pressure of air in said line above that desired at the discharge end in a direction to allow said valve to close, a lever subject to the pressure of air in the line between said valves, means whereby said lever is rendered immovable by pressure in said line equal to the pressure desired at the discharge end of the line and is yieldable to a higher pressure, valve mechanism responsive to the pressure of air in said line coincident with the movement of said lever by the pressure of air in said line above said desired pressure to admit air under pressure from said line to influence said spring means in a direction to allow the valve to close to reduce the pressure in said line below the pressure required at the discharge end thereof, manually adjustable means adapted on the reduction of the pressure on said lever below the pressure required in said discharge end to actuate said lever in a direction to move said valve mechanism to permit the passage of air to said spring means, whereby the latter is operated, and means for exhausting the air pressure applied to said spring means coincident with the actuation of said lever by said manually adjustable means, whereby to permit the valve to be moved to its open position.

5. In air pressure regulating apparatus, an air line having a valve controlled discharge end, a valve in said air line, a lever spring-actuated in one direction to hold said valve open and operable in the other direction under the influence of air pressure in the line beyond the valve in the direction of flow, a lever also subject to said pressure of air in the line, means whereby the last mentioned lever is rendered immovable by pressure in said line equal to the pressure desired at the discharge end of the line and is yieldable to a higher pressure, valve means intermediate of said levers and operable by the pressure of air in said line coincident with the movement of the second mentioned lever below the pressure of air in said line above said desired pressure to admit air from said line to actuate the first mentioned lever in a direction to allow the valve to close to reduce the pressure in the line below the pressure required at the discharge end, adjustable tensioned means adapted on the reduction of the pressure on said second lever below the pressure required in said discharge end to actuate same in a direction to close said valve means against the pressure of air to the first mentioned lever, means for exhausting the pressure applied to said first lever coincident with the actuation of the second lever by said tensioned means whereby to permit the valve to be moved to its open position, and means for setting the tension of said manually adjustable means to correspond to the pressure required at the discharge end of said line.

6. In air pressure regulating apparatus, an air pipe having a valve controlled discharge end, a valve in said pipe, a lever, means for subjecting said lever to the pressure of air in the pipe beyond the valve in the direction of flow, tensioned means for holding said lever in resistance to the pressure of air thereagainst, means for setting the resistance of said lever to correspond to the pressure required at the discharge end of said pipe, said lever being yieldable to a higher pressure, means for visibly indicating the air pressure said lever has been set to withstand, spring means operable in one direction to hold said valve open and being responsive to the pressure of air in said pipe in the other direction to allow said valve to close, and valve means controlling the flow of air to influence said spring means, said valve means being held to its closed position by said lever in resistance to the pressure of air thereagainst in the open position of the valve in said pipe and on said lever yielding to the pressure of air thereagainst being moved by said lever to its open position to permit of the actuation of said spring means by pressure of air in a direction to allow said valve to close.

7. In air pressure regulating apparatus, an air pipe having a valve controlled discharge end, a valve in said pipe, a lever, means for subjecting said lever to the pressure of air in the pipe beyond the valve in the direction of flow, tensioned means for holding said lever in resistance to the pressure of air thereagainst, means for setting the resistance of said lever to correspond to the pressure required at the discharge end of said pipe, said lever being yieldable to a higher pressure, means for visibly indicating the air pressure said lever has been set to withstand, spring means operable in one direction to hold said valve open and being responsive to the pressure of air in said pipe in the other direction to allow said valve to close, valve means controlling the flow of air to influence said spring means, said valve means being held to its closed position by said lever in resistance to the pressure of air thereagainst in the open position of the valve in said pipe and on said lever yielding to the pressure of air thereagainst being moved by said lever to its open position to permit of the actuation of said spring means by pressure of air in a direction to allow said valve to close, means for exhausting the pressure on said spring means subsequent to each closing movement of the valve, and means audibly indicating each movement of said valve to its closed position.

8. In air pressure regulating apparatus, an air line having a valve controlled discharge end, a valve in said line, and means for opening and closing the valve during a period of predetermined pressure development at the valve controlled discharge end of the line, comprising spaced levers pivoted at their corresponding ends, one of said levers being movable in one direction towards the other through spring action whereby to cause pressure to be applied to said valve in a direction away from its seat, and being movable in the other direction by air pressure to permit said valve to move to its closed position, tensioned means for compelling movement of the other of said levers towards the first mentioned lever, means for setting the resistance of said other lever to correspond to the pressure required at the discharge end of the line, said levers being subjected to pressure in the air line beyond the valve in the direction of flow for movement in opposite directions successively, and valve means positioned intermediately of said levers in the pressure line and operable through the movement of the second mentioned lever whereby to alternately open and close the pressure line to the first mentioned lever.

9. In air pressure regulating apparatus, an air line having a valve controlled discharge end, a valve in said line, a spring actuated lever operating in one direction to hold said valve open, a lever actuated in one direction by air pressure, manually adjustable means for compelling movement of the second lever in the opposite direction, means for subjecting said levers to pressure in the air line beyond the valve in the direction of air flow, comprising a pair of diaphragm chambers positioned between said levers and having a communicating passage therebetween, said passage having an intermediate enlargement providing a valve housing, a diaphragm mounted in each of said chambers, a pin carried by each of said diaphragms and slidably extending from the corresponding ends of said chambers and engaging the adjacent lever, a pipe connection from said air line communicating with the interior of the diaphragm chamber adjacent to the second lever, a plunger valve carried by the diaphragm positioned in the last mentioned chamber and slidably extending through the communicating passage between said diaphragm chambers into said valve housing, said plunger having an opening therethrough providing an air passage from the interior of the diaphragm chamber to said valve housing, a coil spring encircling said plunger within its chamber and exerting pressure on the diaphragm in a direction towards the corresponding lever, a valve element slidable within said valve housing and against which said plunger is adapted to seat under the tension of said manually adjustable means when the pressure in said line is below the tension to which said adjustable means has been set whereby to close the passage to the diaphragm adapted to act on the first lever, spring means exerting pressure on said valve element towards said plunger, the throw of said plunger being greater than that of said valve element whereby on the increase of the pressure in the line above the resistance of said manually adjustable means said plunger will be drawn away from said valve element to open the passage to the other diaphragm whereby to actuate the first lever in a direction to allow the valve in the air line to close, said plunger being adapted on each movement towards said movable element to actuate same to cause the exhaust of the pressure on the second lever through the wall of the chamber.

10. In air pressure regulating apparatus, an air pipe having a valve controlled discharge end, a spring actuated valve in said pipe, and means to reciprocate said valve to alternately increase and decrease the air pressure in said pipe, comprising spaced pivoted levers, one of which levers is spring actuated in one direction to exert an opening influence on said valve, and is subject to air pressure for actuation in the other direction to permit said valve to close, a lever subject to pressure in said line beyond the valve in the direction of air flow, valve mechanism interposed in the pressure line between said levers, a tensioned spring connected at its one end to the free end of the second lever, and a bolt connected to the other end of said spring and adjustable longitudinally to regulate the resistance of said second lever against the pressure of air in accordance with the pressure desired in said discharge end whereby on the reduction of pressure in the line below said desired pressure said second lever is moved to actuate said valve mechanism to cut off the air pressure to said first lever and to exhaust the air pressure applied to the first lever to cause the movement of said valve to its open position and whereby on the increase of said air pressure on said second lever above the pressure which same has been set to withstand said second lever will be actuated in the opposite direction to actuate said valve mechanism to admit air pressure to the first lever to actuate same in a direction to permit said valve to close.

11. In air pressure regulating apparatus, an air pipe having a valve controlled discharge end, a spring actuated valve in said pipe, and means to reciprocate said valve to alternately increase and decrease the air pressure in said pipe, comprising spaced pivoted levers, one of which levers is spring actuated in one direction to exert an opening influence on said valve, and is subject to air pressure for actuation in the other direction to permit said valve to close, a push rod having endwise engagement with the valve and at its other end having a link connection with the last mentioned lever, a lever subject to pressure in said line beyond the valve in the direction of air flow, valve mechanism interposed in the pressure line between said levers, a tensioned spring connected at its one end to the free end of the second lever, a bolt connected to the other end of said spring and adjustable longitudinally to regulate the resistance of said lever against the pressure of air in accordance with the pressure desired in said discharge end whereby on the reduction of pressure in the line below said desired pressure said second lever is moved to actuate said valve mechanism to cut off the air pressure to said first lever and to exhaust the air pressure applied to the first lever to cause the movement of said valve to its open position and whereby on the increase of said air pressure on said second lever above the pressure which same has been set to withstand said second lever will be actuated in the opposite direction to actuate said valve mechanism to admit air pressure to the first lever to actuate same in a direction to permit said valve to close a dial having graduations indicative of different degrees of air pressure, an indicator movable over the face of said dial, and means operated by said bolt to move said indicator in accordance with the tension applied to said tensioned spring by the movement of said bolt.

LANCELOT B. BEATH.